(12) United States Patent
Ai et al.

(10) Patent No.: US 12,164,964 B2
(45) Date of Patent: Dec. 10, 2024

(54) MEMORY MANAGEMENT METHOD FOR DEVICE, MEMORY MANAGEMENT DEVICE, AND COMPUTING SYSTEM

(71) Applicant: SHENZHEN MICROBT ELECTRONICS TECHNOLOGY CO., LTD., Shenzhen (CN)

(72) Inventors: Guo Ai, Shenzhen (CN); Zuoxing Yang, Shenzhen (CN); Ruming Fang, Shenzhen (CN); Zhihong Xiang, Shenzhen (CN)

(73) Assignee: SHENZHEN MICROBT ELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/700,181

(22) PCT Filed: Sep. 15, 2022

(86) PCT No.: PCT/CN2022/119004
§ 371 (c)(1),
(2) Date: Apr. 10, 2024

(87) PCT Pub. No.: WO2023/103506
PCT Pub. Date: Jun. 15, 2023

(65) Prior Publication Data
US 2024/0330055 A1    Oct. 3, 2024

(30) Foreign Application Priority Data
Dec. 10, 2021   (CN) .......................... 202111502847.6

(51) Int. Cl.
*G06F 9/46* (2006.01)
*G06F 9/50* (2006.01)

(52) U.S. Cl.
CPC .......... *G06F 9/5016* (2013.01); *G06F 9/5044* (2013.01)

(58) Field of Classification Search
CPC ............................ G06F 9/5016; G06F 9/5044
See application file for complete search history.

(56) References Cited

U.S. PATENT DOCUMENTS

| | | | |
|---|---|---|---|
| 2010/0146620 | A1 | 1/2010 | Simeral et al. |
| 2012/0166705 | A1 | 6/2012 | Dai et al. |

(Continued)

FOREIGN PATENT DOCUMENTS

| | | |
|---|---|---|
| CN | 101546292 A | 9/2009 |
| CN | 101751285 A | 6/2010 |

(Continued)

OTHER PUBLICATIONS

International Search Report and Written Opinion mailed Dec. 13, 2022 in International Patent Application No. PCT/CN2022/119004.

(Continued)

*Primary Examiner* — Gregory A Kessler
(74) *Attorney, Agent, or Firm* — Venable LLP (57) ABSTRACT

A memory management method for a device, and a memory management device and a computing system. The method comprises: determining a plurality of application scenarios of the device; and according to the number of physical memory blocks required by each hardware unit in each application scenario and according to an established mapping relationship between system memory blocks in system memory and physical memory blocks in physical memory, determining system memory blocks allocated to corresponding hardware units, the system memory comprising the physical memory and expanded memory corresponding to the physical memory; wherein the system memory blocks allocated to all the hardware units running in a same (Continued)

---

Determining a plurality of application scenarios of the device — S100

Determining a system memory block allocated to a corresponding hardware unit according to a number of physical memory blocks required by each hardware unit in each application scenario and according to an established mapping relationship between system memory blocks in a system memory and physical memory blocks in a physical memory — S200 application scenario are respectively mapped to different physical memory blocks, or in the system memory blocks allocated to at least two hardware units respectively running in different application scenarios, the system memory block of at least one of the different application scenarios and the system memory block of the other application scenario are mapped to the same physical memory block.

20 Claims, 4 Drawing Sheets

(56) References Cited

U.S. PATENT DOCUMENTS

| | | | |
|---|---|---|---|
| 2017/0046276 | A1 | 2/2017 | Klein et al. |
| 2018/0330081 | A1 | 11/2018 | Hua et al. |

FOREIGN PATENT DOCUMENTS

| | | |
|---|---|---|
| CN | 102541619 A | 7/2012 |
| CN | 103077120 A | 5/2013 |
| CN | 106502918 A | 3/2017 |
| CN | 107038128 A | 8/2017 |
| CN | 109783220 A | 5/2019 |
| CN | 113076231 A | 7/2021 |
| CN | 113485835 A | 10/2021 |
| CN | 113900829 B | 4/2022 |

OTHER PUBLICATIONS

First Office Action issued Jan. 24, 2022 in Chinese Patent Application No. 202111502847.6.
Second Office Action issued Mar. 3, 2022 in Chinese Patent Application No. 202111502847.6.
Notification to Grant Patent Right issued Mar. 16, 2022 in Chinese Patent Application No. 202111502847.6.

MEMORY MANAGEMENT METHOD FOR DEVICE, MEMORY MANAGEMENT DEVICE, AND COMPUTING SYSTEM

CROSS-REFERENCE TO RELATED APPLICATIONS

This application is a national stage of International Application No. PCT/CN2022/119004, filed on Sep. 15, 2022, which claims priority to Chinese Patent Application No. 202111502847.6, entitled "MEMORY MANAGEMENT METHOD FOR DEVICE, MEMORY MANAGEMENT DEVICE, AND COMPUTING SYSTEM" and filed on Dec. 10, 2021. Both of the aforementioned applications are hereby incorporated by reference in their entireties.

TECHNICAL FIELD

The present disclosure relates to the technical field of storage, and in particular, to a memory management method for a device, a memory management device, and a computing system.

BACKGROUND

With the development of technology, the functions of a device are becoming more and more powerful, and the memory required to implement various functions is also increased correspondingly. However, there are still many problems in the memory management method at present, such as a low memory utilization rate and the like. Therefore, there is a need for a new memory management manner.

SUMMARY

One of the objectives of the present disclosure is to provide a memory management method for a device, a memory management device, and a computing system.

According to a first aspect of the present disclosure, there is provided a memory management method for a device, the device including a plurality of hardware units, the memory management method including:
  determining a plurality of application scenarios of the device;
  determining a system memory block allocated to a corresponding hardware unit according to a number of physical memory blocks required by each hardware unit in each application scenario and according to an established mapping relationship between system memory blocks in a system memory and physical memory blocks in a physical memory, the system memory comprising the physical memory and an extended memory corresponding to the physical memory;
  wherein various system memory blocks allocated to all hardware units operating in a same application scenario are mapped to different physical memory blocks respectively; or
  among various system memory blocks allocated to at least two hardware units operating in different application scenarios respectively, a system memory block of at least one application scenario and a system memory block of another application scenario in the different application scenarios are mapped to a same physical memory block.

According to a second aspect of the present disclosure, there is provided a memory management device, including a storage, a processor, and instructions stored on the storage. The instructions, when executed by the processor, implement steps of the memory management method as described above.

According to a third aspect of the present disclosure, there is provided a computing system, including a computing device and the memory management device as described above, wherein the computing device includes a plurality of hardware units; or the computing system includes a computing device in which the memory management device as described above is disposed.

According to a fourth aspect of the present disclosure, there is provided a non-transitory computer-readable storage medium, on which instructions are stored. The instructions, when executed by a processor, implement steps of the memory management method as described above.

According to a fifth aspect of the present disclosure, there is provided a computer program product, including instructions. The instructions, when executed by a processor, implement steps of the memory management method as described above.

Through following detailed descriptions of exemplary embodiments of the present disclosure with reference to the accompanying drawings, other features and advantages of the present disclosure will become clear.

BRIEF DESCRIPTION OF THE DRAWINGS

The accompanying drawings that constitute a part of the specification describe embodiments of the present disclosure, and are used for explaining the principle of the present disclosure together with the specification.

The present disclosure can be understood more clearly according to the following detailed descriptions with reference to the accompanying drawings, wherein.

It is to be noted that in the following implementations illustrated, sometimes the same reference numeral is used in different accompanying drawings to represent the same part or a part with the same function, and repeated illustration thereof is omitted. In the present description, similar reference signs or letters are used for indicating similar items. Therefore, once an item is defined in one accompanying drawing, the item does not need to be further discussed in the subsequent accompanying drawings.

For ease of understanding, the position, size, range, and the like of each structure shown in the accompanying drawings may not indicate the actual position, size, range, and the like. Therefore, the invention disclosed is not limited to the position, size, range, and the like disclosed in the accompanying drawings. In addition, the accompanying drawings are not necessarily drawn to scale, and some features may be enlarged to show details of the particular component.

DETAILED DESCRIPTION

Various exemplary embodiments of the present disclosure are described in detail with reference to the accompanying drawings now. It should be noted that unless illustrated in detail otherwise, the relative deployment of the components and steps, the numerical expressions and the values stated in these embodiments do not limit the scope of the present disclosure.

The following description of at least one exemplary embodiment is merely illustrative, and is not as any limitation to the present disclosure or its application or use. That is, the memory management method for the device, the memory management device, the computing system and the like herein are shown in an exemplary manner to illustrate different embodiments of the circuits and the methods in the present disclosure, and do not intend to be limitations. A person skilled in the art will understand that they merely illustrate exemplary rather than exhaustive manners in which the present disclosure may be implemented.

The technology, method, and device known to a person of ordinary skill in the related art may not be discussed in detail, but in appropriate circumstances, the technology, method, and device shall be regarded as a part of the authorized description.

With the development of chip technology, the integration level and computing power of the device are also increased. However, accompanied with the more and more complex functions of the device, the requirement, of the device, for the memory is also increased. To meet the requirement on the memory, a greater physical memory may be provided for the device, which usually means an increase in the hardware cost. In addition, a method of dynamically applying for memory using software may also be employed to improve the memory utilization rate. Specifically, in the operating process of the device, when a certain hardware unit needs to use the memory, the software applies for and allocates the memory to the hardware unit, and when the hardware unit does not need to use the memory, the memory may be released and recycled for use next time. However, frequent allocations and releases of the memory usually lead to a significant increase in the software overhead. In addition, a large number of memory fragments are prone to be formed, resulting in a decrease in the memory utilization rate.

Figure 1:
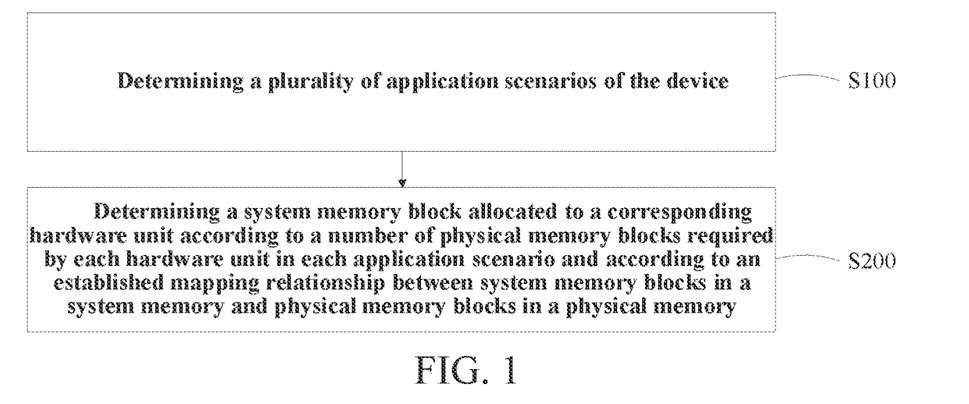
FIG. 1 shows a schematic flowchart of a memory management method for a device according to an exemplary embodiment of the present disclosure.
Figure 9:
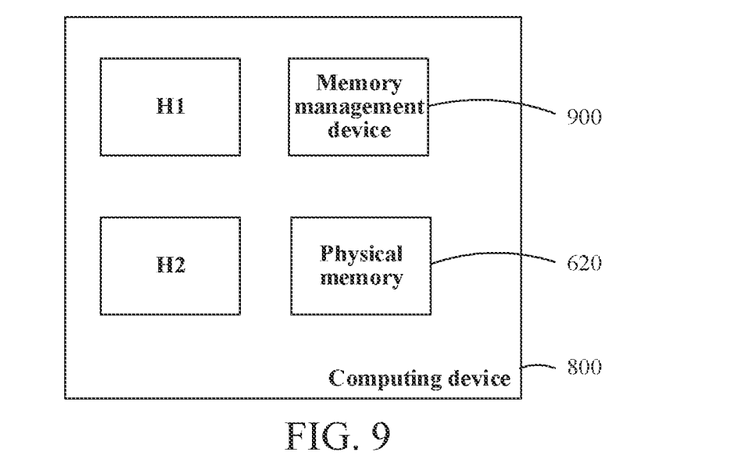
FIG. 9 shows a schematic diagram of a computing device according to an exemplary embodiment of the present disclosure.
Figure 10:
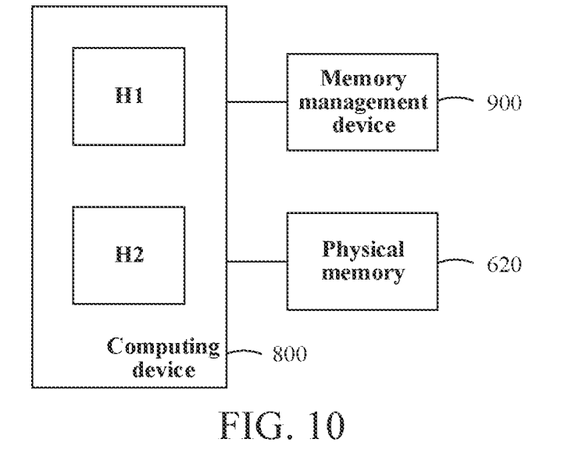
FIG. 10 shows a schematic diagram of a computing device according to another exemplary embodiment of the present disclosure.

To solve at least one of the foregoing problems, the present disclosure proposes a memory management method for a device and a corresponding computing system, wherein the computing system may include a computing device. In the memory management method of the present disclosure, at least part of the hardware units in the device share the physical memory among different application scenarios, thereby achieving full utilization of the memory. As shown in FIGS. 9 and 10, in an exemplary embodiment of the present disclosure, the computing device 800 may include a plurality of hardware units, e.g., the hardware unit H1, the hardware unit H2 and the like, these hardware units may be connected to a bus of the computing device 800, to implement data exchange. As shown in FIG. 1, the memory management method may include:

Step S100, determine a plurality of application scenarios of the device.

To facilitate allocation of the memory for the hardware units in a subsequent step, there is included a case in which at least two application scenarios of the plurality of application scenarios are not proceeded simultaneously. As such, it is possible for the hardware units operating in different application scenarios respectively to share a same part of the physical memory. In addition, for the convenience of processing, in some embodiments, only the matter of runtime of the application scenarios may be considered, and the specific operations run in a same application scenario may be related or unrelated. For example, if the device is an intelligent network camera, all possible application scenarios of the intelligent network camera may include a video recording application scenario and a playback application scenario that are not operated at a same time. It may be understood that, when the device is a device of another type, a plurality of corresponding application scenarios may be determined according to an operating characteristic of the device, which is not limited herein.

Returning to FIG. 1, the memory management method may further include:

Step S200, determining a system memory block allocated to a corresponding hardware unit according to a number of physical memory blocks required by each hardware unit in each application scenario and according to an established mapping relationship between system memory blocks in a system memory and physical memory blocks in a physical memory.

The system memory is the main region, of a system, for temporarily storing program instructions and data, which may include a plurality of system memory blocks with the identical size. The system memory may include the physical memory and the extended memory corresponding to the physical memory. In other words, the first-type system memory block in the system memory is the real physical memory block, and when the first-type system memory block is called, the actual physical memory block is called; while the second-type system memory block is obtained through extending, and the mapping relationship between the second-type system memory block and the physical memory block may be determined as desired, and when the second-type system memory block is called, actually the corresponding physical memory block is called based on the mapping relationship from the corresponding system memory block to the physical memory block. By obtaining the extended memory through extending, the hardware unit may "see" a system memory that is greater than the actual physical memory. One system memory block or a group formed of several system memory blocks may be a minimum allocable unit during the allocation of the system memory, wherein the size of each system memory block may be 32 KB, 64 KB, 128 KB, or the like. To identify the various system memory blocks in the system memory, memory address in one-to-one correspondence with the system memory block may be allocated thereto. As shown in FIGS. 2 to 7, the memory addresses in the system memory may be indicated as 00, 01, 02, . . . , 31, and the like. Hereinafter, to distinguish the system memory block and the physical memory block, the letter "s" is added before the memory address to indicate the corresponding system memory block. For example, the system memory blocks s00, s01, s02, and s31 indicate the system memory blocks with the memory addresses 00, 01, 02, and 31 respectively. In addition, herein the corresponding successive memory block group is indicated by the first memory block and the last memory block in the successive memory block group. For example, the system memory block group from the system memory block s00 to the system memory block s15 may be indicated as (s01, s15), which includes the system memory blocks s01, s02, s03, s04, s05, s06, s07, s08, s09, s10, s11, s12, s13, s14, and s15.

In the operating process of the device, when a certain group of system memory blocks is called, actually a group of physical memory blocks corresponding to the group of system memory blocks in the physical memory may be called. That is, there may be a certain correspondence between the system memory blocks and the physical memory blocks, i.e., the mapping relationship between the system memory blocks and the physical memory blocks to be described in detail hereinafter. Similarly, to identify the various physical memory blocks in the physical memory, the memory address in one-to-one correspondence with the physical memory block may also be allocated thereto. As shown in FIGS. 2 to 7, the memory addresses in the physical memory may be indicated as 00, 01, 02, . . . , 15, and the like, and the letter "p" is added before the memory address to indicate the corresponding physical memory block. For example, the physical memory blocks p00, p01, p02, and p15 indicate the physical memory blocks with the memory addresses 00, 01, 02, and 15 respectively. The size of each physical memory block may be equal to that of a corresponding system memory block, for example, 32 KB, 64 KB, 128 KB, or the like.

By determining the number of the system memory blocks required by each hardware unit in each application scenario, preparation can be made for subsequent memory allocation. In the present disclosure, to enable at least part of the hardware units to share at least part of the physical memory, it should be satisfied that there are at least two application scenarios of the plurality of application scenarios, in which only part of the plurality of hardware units are required to operate, and another part of the hardware units are not required to operate.

In addition, after the number of system memory blocks required by each hardware unit in each application scenario is determined, the hardware units may be grouped and/or sorted in accordance with the number of the required system memory blocks and the like, so as to facilitate more scientific memory allocation in a subsequent step and to improve the memory utilization rate.

The various system memory blocks allocated to all hardware units operating in a same application scenario are mapped to different physical memory blocks respectively. Specifically, during the allocation of the system memory, considering that operations in the same application scenario may be performed simultaneously and that the corresponding system memory (or the corresponding physical memory) needs to be called simultaneously, thus the various system memory blocks for all the hardware units operating in the same application scenario need to be mapped to different physical memory blocks in the physical memory respectively and cannot be shared, so as to avoid a conflict caused by mapping system memory blocks that may be called simultaneously to the same physical memory block, thereby ensuring the normal operation of the application scenario.

It may be understood that the size of the physical memory should be at least the size of the system memory required by an application scenario of the plurality of application scenarios that requires the most system memory blocks, so as to ensure that each application scenario can be operated normally. For example, in a specific example, it is assumed that all the determined application scenarios of a certain device include the application scenarios A1, A2, and A3, the size of the system memory that the corresponding hardware unit(s) need to call is 82 MB in total in the application scenario A1, the size of the system memory that the corresponding hardware unit(s) need to call is 240 MB in total in the application scenario A2, and the size of the system memory that the corresponding hardware unit(s) need to call is 25 MB in total in the application scenario A3, then to ensure that each application scenario can be operated normally, the size of the physical memory should be greater than or equal to the maximum required system memory 240 MB therein, for example, the physical memory may be 256 MB.

In addition, among the various system memory blocks allocated to at least two hardware units operating in different application scenarios, a system memory block of at least one application scenario and a system memory block of another application scenario in the different application scenarios are mapped to a same physical memory block. Specifically, since different application scenarios are not proceeded simultaneously, the physical memory block called by a certain hardware unit in a certain application scenario may also be called by another hardware unit in another application scenario without causing a conflict. As such, among the system memory block groups of the system memory that are respectively allocated to hardware units operating in different application scenarios, at least part of the system memory blocks in one system memory block group and at least part of the system memory blocks in another system memory block group may be mapped to the same physical memory block in the physical memory, so that the same physical memory block may be reused in a plurality of application scenarios, to make full use of the physical memory and to avoid an increase in the hardware cost.

In the process of memory allocation, sorting may also be performed according to factors such as the size of the memory that each hardware unit may share with other hardware unit, so as to uniformly plan the memory allocation of each hardware unit, implementing the full utilization of the physical memory. After the memory allocation is completed, each hardware unit will have a system memory block group corresponding thereto, and the system memory block group is mapped to the corresponding physical memory block in the physical memory. As such, based on the correspondence or mapping relationship among the hardware units, the system memory block groups, and the physical memory blocks, the corresponding physical memory block may be called in the operation process of the hardware unit in the corresponding application scenario.

To clearly establish the correspondence between the hardware units and the system memory blocks, it may be limited that each system memory block in the system memory is allocated to at most one of the plurality of hardware units. That is, one same system memory block cannot be shared by two or more hardware units, so as to avoid disorder in the memory allocation.

In addition, since two or more system memory blocks in the system memory may be mapped to a same physical memory block, the size of the system memory is usually greater than that of the physical memory. The portion of the system memory that exceeds the physical memory may be referred to as an extended memory (for example, the system memory block group (s08, s15) in FIGS. 2 and 6, the system memory block group (s08, s23) in FIGS. 3 and 4, the system memory block group (s16, s23) in FIG. 5, and the system memory block group (s16, s31) in FIG. 7 are the extended memory portions of the system memories in the corresponding figures respectively). In the operating process of the device, when the extended memory is called, actually the corresponding physical memory blocks are called according to the mapping relationship between this part of the system memory blocks and the physical memory blocks in the physical memory. The size of the system memory may be a multiple of that of the physical memory, and the multiple is a number greater than 1. Generally, the size of the system memory may be 1.5 to 5 times the size of the physical memory. For example, in the embodiments shown in FIGS. 2, 6, and 7, the size of the system memory is 2 times the size of physical memory. In the embodiments shown in FIGS. 3 and 4, the size of system memory is 3 times the size of physical memory. In the embodiment shown in FIG. 5, the size of the system memory is 1.5 times the size of the physical memory. The mapping relationship between the system memory blocks and the physical memory blocks is to be further described in detail hereinafter.

Further, in some embodiments, the size of the system memory may be an integer multiple of that of the physical memory (for example, as shown in the specific examples in FIGS. 2 to 4 and 6 to 7). Moreover, the multiple of the size of the system memory to the size of the physical memory may be determined according to the number of scenarios of the plurality of application scenarios. For example, when there are two application scenarios in total that do not occur simultaneously in the device, the size of the system memory may be twice the size of the physical memory. Alternatively, when there are three or four application scenarios in total that do not occur simultaneously in the device, the size of the system memory may be three or four times the size of the physical memory respectively.

In addition, when the size of the system memory is an integer multiple of that of the physical memory, the system memory may be divided into a plurality of groups of system sub-memories. The size of each group of system sub-memory is equal to that of the physical memory, and the fixed one-to-one mapping relationship between the system memory blocks in each group of system sub-memory and the physical memory blocks in the physical memory is established. As such, the physical memory block to which each system memory block may be mapped is fixed. For example, in each group of system sub-memory, the $i^{th}$ system memory block always corresponds to the $i^{th}$ physical memory block in the physical memory, that is, in each group of system sub-memory, the $1^{st}$ system memory block corresponds to the $1^{st}$ physical memory block in the physical memory, the $2^{nd}$ system memory block corresponds to the $2^{nd}$ physical memory block in the physical memory, and so on. Similarly, the $(i+n*Np)^{th}$ extended memory block of the system memory blocks may be mapped to the $i^{th}$ physical memory block in the physical memory respectively, wherein i is an integer greater than zero, n is an integer greater than or equal to zero, and Np is the total number of the physical memory blocks in the physical memory. During the allocation of the system memory for the hardware unit, if a certain system memory block is allocated to the hardware unit, the occupancy status of the system memory block occupied by the hardware unit may be marked as "1", and otherwise it may be set to "0". Further, for each hardware unit, a corresponding memory allocation mapping table may be formed according to the memory address and the occupancy status of the corresponding system memory block. When the hardware unit operates, the corresponding system memory block may be called according to the memory allocation mapping table, and then the corresponding physical memory block is called. For example, in a specific example of FIG. 7, the memory allocation mapping table of the hardware unit Ha may be represented as:

| s01 | s02 | s03 | s04 |
|---|---|---|---|
| 1 | 1 | 1 | 1 |

The memory allocation mapping table of the hardware unit Hd may be represented as:

| s16 | s17 | s18 | s19 | s20 | s21 | s22 | s23 | s24 | s25 | s26 |
|---|---|---|---|---|---|---|---|---|---|---|
| 1 | 1 | 1 | 1 | 0 | 0 | 0 | 0 | 0 | 1 | 1 | wherein "1" indicates "used", and "0" indicates "not used". The actual physical memory blocks are p0, p1, p2, p3, p9, and p10.

In addition, in some embodiments, the system memory blocks allocated to a same hardware unit may be limited in a same group of system sub-memory, so as to facilitate management of correspondence or mapping relationship among the hardware units, the system memory blocks, and the physical memory blocks.

In some embodiments, to avoid the software overhead brought by the repeated applications and releases of the memory and to avoid the generation of memory fragments as much as possible, the mapping relationship between the system memory blocks in the corresponding system memory block group and the physical memory blocks in the physical memory may be determined before the operation of any of the plurality of application scenarios, or before start-up of the device, so as to determine the system memory block group of the system memory that is allocated to the corresponding hardware unit. That is, before the device is put into use, the mapping relationship from the system memory blocks to the physical memory blocks may be pre-determined, thereby allocating the corresponding system memory blocks to all the hardware units in the device in advance. Alternatively, before each of the plurality of application scenarios is started, the mapping relationship from the system memory blocks to the physical memory blocks may be determined, thereby allocating corresponding system memory blocks to the corresponding hardware unit.

Further, in the operating process of any of the plurality of application scenarios, or after the device is started or in the operating process of the device, the correspondence between each of the plurality of hardware units and the corresponding system memory block group of the hardware unit may be unchanged, and the mapping relationship between the system memory blocks in each system memory block group and the physical memory blocks in the physical memory may be unchanged, that is, the system memory blocks allocated to the hardware unit and the overall mapping relationship between the system memory blocks and the physical memory blocks may no longer change. As such, in the operating process of the device, dynamic applications and releases of the memory may no longer be performed, thereby greatly reducing the software overhead, helping to improve the operating efficiency of the device and avoiding the generation of a large amount of memory fragments.

In addition, in some embodiments, the memory management method may further include: when an application scenario set including a plurality of application scenarios changes, returning to perform the step of determining a plurality of application scenarios of the device.

Specifically, in some embodiments, usage scenario of the device may change radically. For example, a certain device may be recycled from another computing system, and different computing systems may be used for processing completely different tasks. Correspondingly, the application scenario set of the device is to be completely different from the original one, and the plurality of application scenarios and the corresponding memory allocation relationship determined for the original computing system may no longer be applicable. Therefore, when the application scenario set of the device changes, the memory may be re-allocated to a plurality of hardware units in the device. Specifically, a plurality of application scenarios of the device may be re-determined, and then the system memory block allocated to the corresponding hardware unit is determined according to the number of physical memory blocks required by each hardware unit in each application scenario and according to the established mapping relationship between the system memory blocks in the system memory and the physical memory blocks in the physical memory, the system memory including the physical memory and the extended memory corresponding to the physical memory. In some cases, the various system memory block groups allocated to all hardware units operating in a same application scenario are mapped to different physical memory blocks in the physical memory respectively. Alternatively or additionally, among various system memory blocks allocated to at least two hardware units operating in different application scenarios respectively, a system memory block of at least one application scenario and a system memory block of another application scenario in the different application scenarios are mapped to a same physical memory block, so as to implement efficient and flexible utilization of the device.

Further, to avoid memory fragmentation, in some embodiments, the system memory may be allocated such that in at least one of the plurality of hardware units, all system memory blocks in the system memory block group corresponding to the hardware unit are mapped to successively distributed physical memory blocks in the physical memory. This may be implemented by performing overall planning on the system memory allocation after determining the number of system memory blocks required by each hardware unit in each application scenario.

In some embodiments, the system memory may be further allocated such that the at least one hardware unit corresponding to the successively distributed physical memory blocks in the physical memory is the hardware unit that requires the largest number of system memory blocks. For example, the maximum number of system memory blocks that may be required by a hardware unit in each of the plurality of application scenarios may be determined as the number of system memory blocks to be allocated to the hardware unit, and the hardware unit of the plurality of hardware units to which the maximum number of system memory blocks allocated is selected. In the allocation process, a system memory block group may be preferentially allocated to this hardware unit, and the corresponding system memory block group is mapped to successively distributed physical memory blocks in the physical memory.

In some other embodiments, the system memory may also be allocated such that the number of the hardware units corresponding to the successively distributed physical memory blocks in the physical memory is most among the plurality of hardware units. For example, the maximum number of the system memory blocks that may be required by a hardware unit among each of the plurality of application scenarios may be determined as the number of system memory blocks to be allocated to the hardware unit, and as many hardware units as possible are allocated to the successively distributed physical memory blocks.

Figure 2:
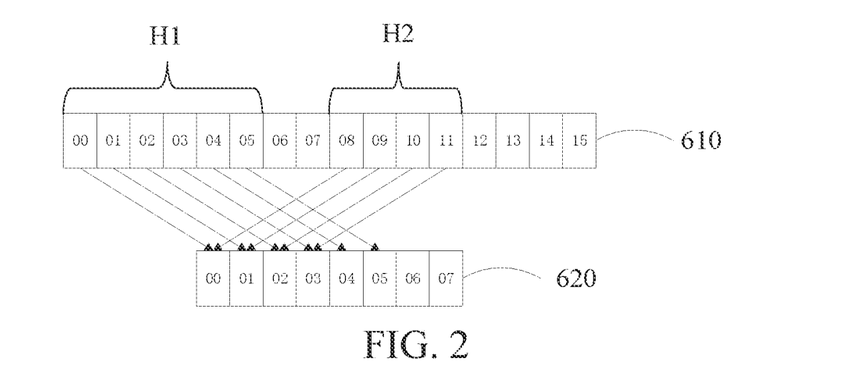
FIG. 2 shows a schematic diagram of memory allocation according to a first specific example of the present disclosure.

In a first specific example of the present disclosure, as shown in FIG. 2, the plurality of hardware units may include a first hardware unit H1 and a second hardware unit H2. The first hardware unit H1 and the second hardware unit H2 may operate in different application scenarios respectively. As such, the first hardware unit H1 and the second hardware unit H2 may share at least part of the physical memory without causing a conflict. The system memory 610 may include a first system memory block group (s00, s05) allocated to the first hardware unit H1 and a second system memory block group (s08, s11) allocated to the second hardware unit H2, and at least part of the first system memory blocks in the first system memory block group (s00, s05) and at least part of the second system memory blocks in the second system memory block group (s08, s11) may be mapped to a same physical memory block in the physical memory 620. In the specific example shown in FIG. 2, the first system memory block s00 and the second system memory block s08 are mapped to the same physical memory block p00, the first system memory block s01 and the second system memory block s09 are mapped to the same physical memory block p01, the first system memory block s02 and the second system memory block s10 are mapped to the same physical memory block p02, and the first system memory block s03 and the second system memory block s11 are mapped to the same physical memory block p03.

Figure 3:
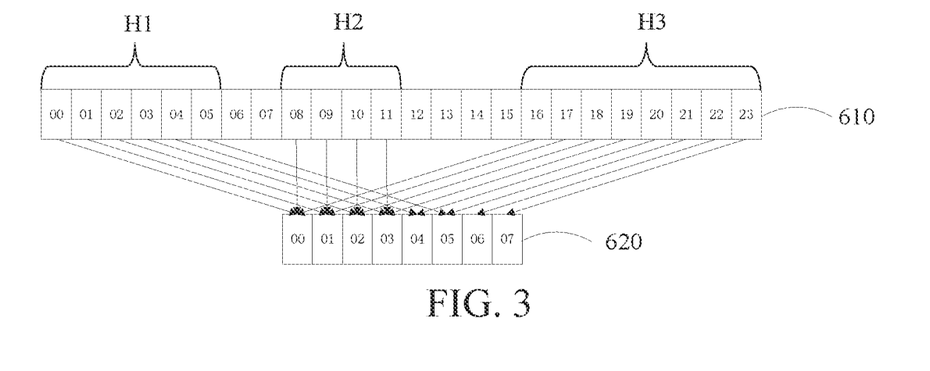
FIG. 3 shows a schematic diagram of memory allocation according to a second specific example of the present disclosure.

In a second specific example of the present disclosure, as shown in FIG. 3, the plurality of hardware units may further include a third hardware unit H3. The first hardware unit H1, the second hardware unit H2, and the third hardware unit H3 operate in different application scenarios respectively. As such, the first hardware unit H1, the second hardware unit H2, and the third hardware unit H3 can share at least part of the physical memory without causing a conflict. The system memory 610 may further include a third system memory block group (s16, s23) allocated to the third hardware unit H3, and at least part of the first system memory blocks in the first system memory block group (s00, s05), at least part of the second system memory blocks in the second system memory block group (s08, s11), and at least part of the third system memory blocks in the third system memory block group (s16, s23) are mapped to a same physical memory block in the physical memory. In the specific example shown in FIG. 3, the first system memory block s00, the second system memory block s08, and the third system memory block s16 are mapped to the same physical memory block p00, the first system memory block s01, the second system memory block s09, and the third system memory block s17 are mapped to the same physical memory block p01, the first system memory block s02, the second system memory block s10, and the third system memory block s18 are mapped to the same physical memory block p02, the first system memory block s03, the second system memory block s11, and the third system memory block s19 are mapped to the same physical memory block p03, the first system memory block s04 and the third system memory block s20 are mapped to the same physical memory block p04, the first system memory block s05 and the third system memory block s21 are mapped to the same physical memory block p05, and the third system memory blocks s22 and s23 are mapped to the physical memory blocks p06 and p07 respectively.

Figure 4:
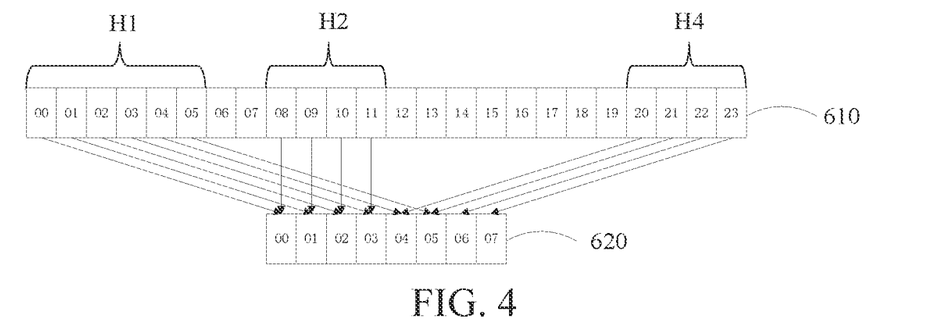
FIG. 4 shows a schematic diagram of memory allocation according to a third specific example of the present disclosure.

In a third specific example of the present disclosure, as shown in FIG. 4, the plurality of hardware units may further include a fourth hardware unit H4. The fourth hardware unit H4 and the first hardware unit H1 operate in different application scenarios respectively, and the fourth hardware unit H4 and the second hardware unit H2 both operate in at least one of the plurality of application scenarios. As such, the first hardware unit H1 and the fourth hardware unit H4 may share at least part of the physical memory, but the second hardware unit H2 and the fourth hardware unit H4 cannot share the physical memory. The system memory 610 may further include a fourth system memory block group (s20, s23) allocated to the fourth hardware unit H4, at least another part of the first system memory blocks in the first system memory block group (s00, s05) and at least part of the fourth system memory blocks in the fourth system memory block group (s20, s23) are mapped to a same physical memory block in the physical memory, and the second system memory block group (s08, s11) and the fourth system memory block group (s20, s23) are mapped to different physical memory blocks in the physical memory respectively. In the specific example shown in FIG. 4, the first system memory block s00 and the second system memory block s08 are mapped to the same physical memory block p00, the first system memory block s01 and the second system memory block s09 are mapped to the same physical memory block p01, the first system memory block s02 and the second system memory block s10 are mapped to the same physical memory block p02, the first system memory block s03 and the second system memory block s11 are mapped to the same physical memory block p03, and therefore the fourth system memory block group (s20, s23) cannot be mapped to the physical memory block group (p01, p03) to which the second system memory block group (s08, s11) has been mapped. In the case that the one-to-one mapping relationship between the system memory blocks in each group of system sub-memory and the physical memory blocks in the physical memory are fixed, the fourth hardware unit H4 cannot occupy the first four system memory blocks (s16, s19) in the system sub-memory (s16, s23), so as to avoid confliction with the second hardware unit H2, and can only occupy the last four system memory blocks (s20, s23). That is, the fourth system memory block s20 and the first system memory block s04 may be mapped to the same physical memory block p04, the fourth system memory block s21 and the first system memory block s05 may be mapped to the same physical memory block p05, and the other fourth system memory blocks s22 and s23 may be mapped to the physical memory blocks p06 and p07 respectively.

Figure 5:
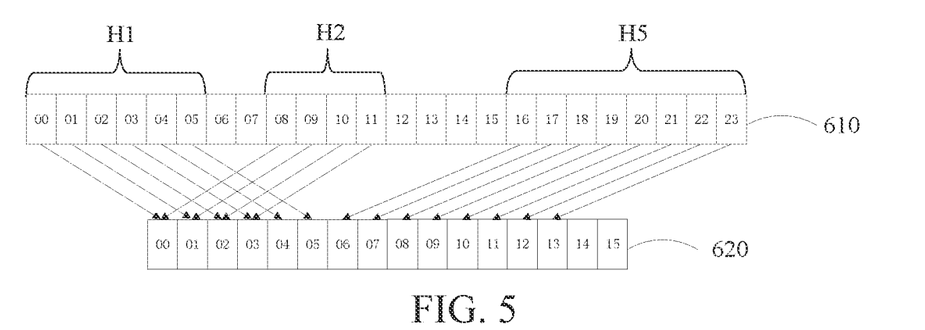
FIG. 5 shows a schematic diagram of memory allocation according to a fourth specific example of the present disclosure.

In a fourth specific example of the present disclosure, as shown in FIG. 5, the plurality of hardware units may further include a fifth hardware unit H5. The fifth hardware unit H5 and the first hardware unit H1 both operate in at least one of the plurality of application scenarios, and the fifth hardware unit H5 and the second hardware unit H2 both operate in at least another one of the plurality of application scenarios. As such, the fifth hardware unit H5 cannot share the physical memory with any one of the first hardware unit H1 and the second hardware unit H2. Correspondingly, the system memory 610 may include a fifth system memory block group (s16, s23) allocated to the fifth hardware unit H5, the first system memory block group (s00, s05) and the fifth system memory block group (s16, s23) are mapped to different physical memory blocks in the physical memory respectively, and the second system memory block group (s08, s11) and the fifth system memory block group (s16, s23) are mapped to different physical memory blocks in the physical memory respectively. In the specific example shown in FIG. 5, the fifth system memory block group (s16, s23) may be mapped to the physical memory block group (p06, p13) that is not occupied by the first hardware unit H1 or the second hardware unit H2 in the physical memory. Alternatively, in another specific example, the fifth system memory block group (s16, s23) may be mapped to the physical memory block group (p08, p15) that is not occupied by the first hardware unit H1 or the second hardware unit H2 in the physical memory. As such, it may be ensured that the $i^{th}$ system memory block in each system sub-memory can be mapped to the $i^{th}$ physical memory block in the corresponding physical sub-memory, so as to facilitate the memory management. In the embodiment shown in FIG. 5, the size of the system memory may be 1.5 times the size of the physical memory.

Figure 6:
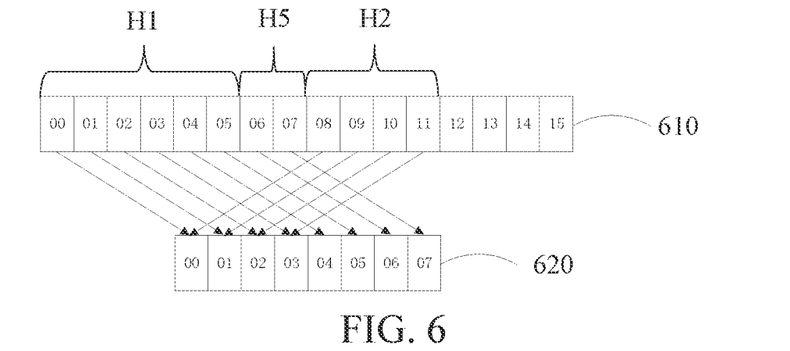
FIG. 6 shows a schematic diagram of memory allocation according to a fifth specific example of the present disclosure.
Figure 7:
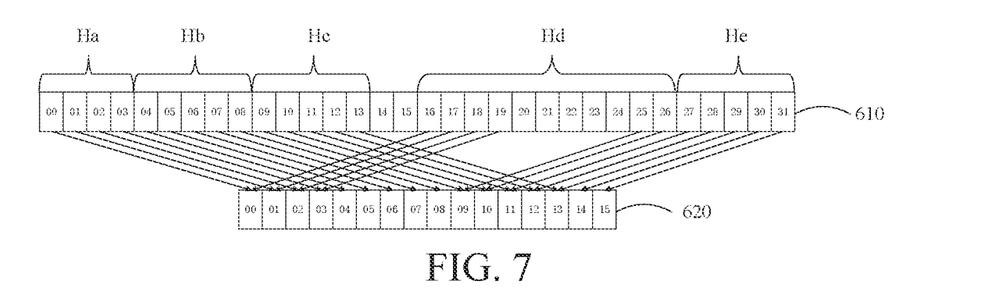
FIG. 7 shows a schematic diagram of memory allocation according to a sixth specific example of the present disclosure.

In a fifth specific example shown in FIG. 6, in a case that the fifth system memory block group (s06, s07) required by the fifth hardware unit H5 is small enough, the fifth system memory block group (s06, s07) and the first system memory block group (s00, s05) may be in a same system sub-memory and be mapped one-by-one to the corresponding physical memory blocks in the physical memory, and the second system memory block group (s08, s11) may share part of the physical memory blocks with the first system memory block group (s00, s05).

In a sixth specific example of the present disclosure, as shown in FIG. 7, it is assumed that the device is the intelligent network camera described above, and there are two application scenarios including the video recording application scenario and the playback application scenario. The hardware units Ha and Hc are only used in the video recording application scenario, the hardware units Hd and He are only used in the playback application scenario, and the hardware unit Hb is to be used in both the video recording application scenario and the playback application scenario, then the memory may be allocated to the intelligent network camera as follows. In the video recording application scenario, the hardware units Ha, Hb, and Hc are used, thus the system memory block group (s00, s03) may be allocated to the hardware unit Ha and be mapped to the physical memory block group (p00, p03); the system memory block group (s04, s08) may be allocated to the hardware unit Hb and be mapped to the physical memory block group (p04, p08); and the system memory block group (s09, s13) may be allocated to the hardware unit Hc and be mapped to the physical memory block group (p09, p13). In the playback application scenario, the hardware units Hb, Hd, and He are used, the hardware unit Hd may share the physical memory with the hardware unit Ha and/or Hc, and the hardware unit He may share the physical memory with the hardware unit Ha and/or Hc, but neither the hardware unit Hd nor He can share the physical memory with the hardware unit Hb. In the allocation, the system memory block group (s16, s26) may be allocated to the hardware unit Hd, wherein (s16, s19) are mapped to the physical memory block group (p00, p03) respectively. Since the physical memory block group (p04, p08) to which the system memory block group (s20, s24) mapped is occupied by the hardware unit Hb, the system memory block group (s20, s24) cannot be allocated to the hardware unit Hd. That is, the system memory block group (s20, s24) is vacant and is not allocated to any hardware unit, so as to avoid a conflict, but the following system memory block group (s25, s26) can be allocated to the hardware unit Hd and be mapped to the physical memory block group (p09, p10) respectively, and sharing with the hardware unit Hc is implemented. That is, in the operating process of the hardware unit Hd, the actually allocated system memory blocks thereto are (s16, s19) and (s25, s26). Further, the system memory block group (s27, s31) may be allocated to the hardware unit He and be mapped to the physical memory blocks (p11, p15) respectively, wherein the physical memory blocks (p11,p13) are shared by the hardware unit Hc and the hardware unit He.

The memory management method of the present disclosure proposes the algorithm and the mapping relationship between the system memory and the physical memory. By extending the system memory, the hardware units in the device may see larger system memory without increasing the actual physical memory, and the utilization rate of the physical memory is improved. When the system or a corresponding application scenario starts, the system memory block allocated to the corresponding hardware unit is determined according to established mapping relationship between the system memory blocks in the system memory and the physical memory blocks in the physical memory. Such pre-planning facilitates the stability and reliability of the system, and makes it very convenient to debug the device in a case that a problem occurs.

The memory management method of the present disclosure is particularly applicable to a case in which the application scenarios of the device are relatively simple, usage of the memory therein is highly correlated with the application scenarios, and at least part of the memory is not used simultaneously in different application scenarios. Such device or computing device may include, for example, an Artificial Intelligence Internet of Things (AIot) device that can be used in the Artificial Intelligence Internet of Things (AIoT) technology. The AIoT technology integrates the Artificial Intelligence (AI) technology and the Internet of Things (IoT) technology. In the AIot technology, massive data from different dimensions can be generated and collected through the Internet of Things, and digitization and intelligent linkage of everything are implemented through the technologies such as big data analysis, artificial intelligence, and the like, thereby forming an intelligent ecosystem, achieving mutual integration and communication among different intelligent terminal devices, different system platforms, and different application scenarios. As the performance of the device improves, the device may serve as an AIot device of an edge device or a mobile device, and perform tasks that used to be performed by a cloud device, so as to provide services nearby, thereby helping to achieve faster service response and better privacy protection. It can be understood that the device may also be used in other applications and implement corresponding functions, which is not limited herein.

In some embodiments, the device or the computing device of the present disclosure may be included in a system on chip (SoC). The SoC may have a small volume, high speed, low power consumption, and rich system functions, and have a relatively low cost. In some embodiments, as shown in FIG. 9, the physical memory 620 may be included in the computing device 800. Alternatively, as shown in FIG. 10, the physical memory 620 and the computing device 800 may also be disposed separately. For example, the physical memory 620 and the computing device 800 may be different components respectively on the SoC, and exchange data by a bus or the like. The computing device includes a plurality of hardware units.

Figure 8:
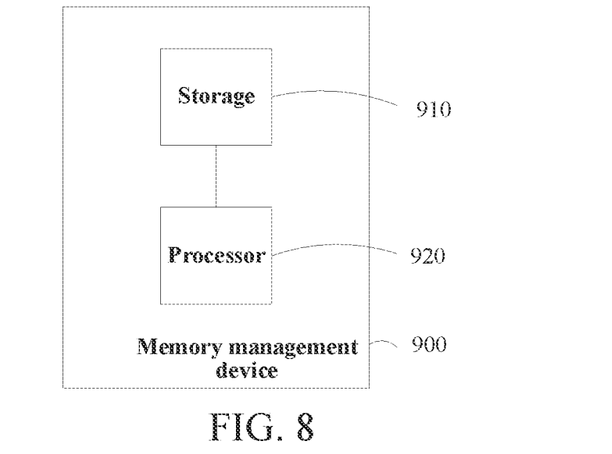
FIG. 8 shows a schematic diagram of a memory management device according to an exemplary embodiment of the present disclosure.

The present disclosure further proposes a memory management device 900. As shown in FIG. 8, the memory management device 900 may include a storage 910, a processor 920, and instructions stored on the storage 910. The instructions, when executed by the processor 920, implement the steps of the memory management method as described above. As shown in FIG. 9, the memory management device 900 may be included in the computing device 800. Alternatively, as shown in FIG. 10, the computing device 800 may be disposed separately from the memory management device 900.

The processor 920 may perform various actions and processing according to the instructions stored in the storage 910. Specifically, the processor 920 may be an integrated circuit chip with a signal processing capability. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The methods, steps, and logic block diagrams that are disclosed in the embodiments of the present disclosure may be implemented or performed. The general-purpose processor may be a microprocessor, or the processor may be any conventional processor or the like, or may be an X810 architecture, an ARM architecture, or the like.

The storage 910 has executable instructions stored therein. The instructions are executed by the processor 920 to implement the foregoing memory management method. The storage 910 may be a volatile storage or a non-volatile storage, or may include both volatile and non-volatile storages. The non-volatile storage may be a read-only memory (ROM), a programmable read-only memory (PROM), an erasable programmable read-only memory (EPROM), an electrically erasable programmable read-only memory (EEPROM), or a flash memory. The volatile storage may be a random access memory (RAM) and is used as an external cache. Through illustrative but not limited description, many forms of RAMs are available, for example, a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchronous link dynamic random access memory (SLDRAM), and a direct rambus random access memory (DR RAM). It should be noted that the storages of the method described herein are intended to include but are not limited to these and any other suitable types of storages.

The present disclosure further proposes a non-transitory computer-readable storage medium with instructions stored thereon. When the instructions are executed by a processor, the steps of the foregoing memory management method are implemented.

Similarly, the non-transitory computer-readable storage medium in the embodiments of the present disclosure may be a volatile storage or a non-volatile storage, or may include both volatile and non-volatile storages. It should be noted that the computer-readable storage medium described herein include but are not limited to these and any other suitable types of storages.

The present disclosure further provides a computer program product. The computer program product may include instructions. When the instructions are executed by a processor, the steps of the foregoing memory management method are implemented.

The instructions may be any instruction set to be executed directly, such as machine code, or any instruction set to be executed indirectly, such as scripts, by one or more processors. The terms "instruction", "application", "process", "step", and "program" may be used interchangeably herein. The instructions may be stored in an object code format for direct processing by one or more processors, or stored in any other computer language including scripts or collections of independent source code modules that are interpreted on demand or compiled in advance. The instructions may include instructions that cause, for example, one or more processors to function as various neural networks herein. The functions, methods, and routines of the instructions are described in more details in elsewhere herein.

In addition, the implementations of the present disclosure may also include the following examples.

1. A memory management method for a device, the device comprising a plurality of hardware units, the memory management method comprising:
   determining a plurality of application scenarios of the device;
   determining a system memory block allocated to a corresponding hardware unit according to a number of physical memory blocks required by each hardware unit in each application scenario and according to an established mapping relationship between system memory blocks in a system memory and physical memory blocks in a physical memory, the system memory comprising the physical memory and an extended memory corresponding to the physical memory;
   wherein various system memory blocks allocated to all hardware units operating in a same application scenario are mapped to different physical memory blocks respectively; or
   among various system memory blocks allocated to at least two hardware units operating in different application scenarios respectively, a system memory block of at least one application scenario and a system memory block of another application scenario in the different application scenarios are mapped to a same physical memory block.

2. The memory management method according to 1, determining the system memory block allocated to the corresponding hardware unit comprises:
   the system memory block is allocated such that all system memory blocks allocated to at least one hardware unit of the plurality of hardware units are mapped to successively distributed physical memory blocks in the physical memory.

3. The memory management method according to 2, the system memory is allocated such that the at least one hardware unit corresponding to the successively distributed physical memory blocks in the physical memory is a hardware unit that requires a largest number of system memory blocks.

4. The memory management method according to 2, the system memory is allocated such that a number of the hardware units corresponding to the successively distributed physical memory blocks in the physical memory is most among the plurality of hardware units.

5. The memory management method according to 1, a size of the physical memory is greater than or equal to a size of the system memory required by an application scenario of the plurality of application scenarios that requires a most number of system memory blocks.

6. The memory management method according to 1, an $(i+n*Np)^{th}$ extended memory block in the system memory blocks is mapped to an $i^{th}$ physical memory block in the physical memory respectively, wherein i is an integer greater than zero, n is an integer greater than or equal to zero, and Np is a total number of physical memory blocks in the physical memory.

7. The memory management method according to 1, a size of the system memory is a multiple of that of the physical memory, and the multiple is a number greater than 1.

8. The memory management method according to 7, the multiple of the size of the system memory to the size of the physical memory is determined according to a number of scenarios of the plurality of application scenarios.

9. The memory management method according to 1, the plurality of hardware units comprise a first hardware unit and a second hardware unit, the first hardware unit and the second hardware unit operate in different application scenarios respectively, the system memory comprises a first system memory block group allocated to the first hardware unit and a second system memory block group allocated to the second hardware unit, and at least part of the first system memory blocks in the first system memory block group and at least part of the second system memory blocks in the second system memory block group are mapped to a same physical memory block in the physical memory.

10. The memory management method according to 9, the plurality of hardware units further comprise a fourth hardware unit, the fourth hardware unit and the first hardware unit operate in different application scenarios respectively, and the fourth hardware unit and the second hardware unit both operate in at least one application scenario of the plurality of application scenarios, the system memory further comprises a fourth system memory block group allocated to the fourth hardware unit, and at least another part of the first system memory blocks in the first system memory block group and at least part of the fourth system memory blocks in the fourth system memory block group are mapped to a same physical memory block in the physical memory, the second system memory block group and the fourth system memory block group are mapped to different physical memory blocks in the physical memory respectively.

11. The memory management method according to 9, the plurality of hardware units further comprise a fifth hardware unit, the fifth hardware unit and the first hardware unit both operate in at least one application scenario of the plurality of application scenarios, and the fifth hardware unit and the second hardware unit both operate in at least another application scenario of the plurality of application scenarios, the system memory further comprises a fifth system memory block group allocated to the fifth hardware unit, and the first system memory block group and the fifth system memory block group are mapped to different physical memory blocks in the physical memory respectively, the second system memory block group and the fifth system memory block group are mapped to different physical memory blocks in the physical memory respectively.

12. A memory management device, comprising a storage, a processor, and instructions stored on the storage, the instructions, when executed by the processor, implement steps of the memory management method according to any one of 1 to 11.

13. A computing system, comprising:
a computing device and the memory management device according to 12, wherein the computing device comprises a plurality of hardware units; or a computing device in which the memory management device according to 12 is disposed.

14. The computing system according to 13, wherein the computing device further comprises a physical memory.

15. The computing system according to 13, wherein the computing device comprises an artificial intelligence Internet of Things device; and/or the computing device is comprised in a system on chip.

16. A non-transitory computer-readable storage medium, on which instructions are stored, the instructions, when executed by a processor, implement steps of the memory management method according to any one of 1 to 11.

17. A computer program product, comprising instructions, the instructions, when executed by a processor, implement steps of the memory management method according to any one of 1 to 11.

In all the examples shown and discussed herein, any specific value should be construed as merely illustrative and not as a limitation. Therefore, other examples of exemplary embodiments may have different values.

The words "front", "rear", "top", "bottom", "over", "under", and the like in the description and in the claims, if any, are used for descriptive purposes and not necessarily for describing unchanged relative positions. It should be understood that the words used in such a way are interchangeable under appropriate circumstances so that the embodiments of the present disclosure described herein, for example, can be operated in other orientations that are different from those shown herein or those described otherwise.

As used herein, the word "exemplary" means "serving as an example, instance, or illustration" rather than as a "model" to be exactly reproduced. Any implementation exemplarily described herein is not necessarily to be explained as preferred or advantageous over other implementations. In addition, the present disclosure is not limited by any stated or implied theory provided in the above technical field, background, summary or detailed description.

As used herein, the word "substantially" means that any minor variation caused by the deflect of the design or manufacture, the tolerance of the device or the element, the environmental influence, and/or other factors is included. The word "substantially" also allows for the difference from the perfect or ideal situation caused by the parasitic effect, noise, and other practical considerations that may exist in the actual implementation.

Elements, nodes, or features that are "connected" or "coupled" together may be indicated in the foregoing description. As used herein, unless expressly stated otherwise, "connect" means that one element/node/feature is directly connected to (or directly communicate with) another element/node/feature electrically, mechanically, logically, or in other manners. Similarly, unless expressly stated otherwise, "couple" means that one element/node/feature may be directly or indirectly linked with another element/node/feature mechanically, electrically, logically, or in other manners, to allow an interaction, even though the two features may not be directly connected. That is, "couple" intends to include both direct and indirect links of the element or other features, including the connections using one or more intermediate elements.

It should be further understood that the word "comprise/include", when used herein, specifies the presence of indicated features, integers, steps, operations, units, and/or components, but does not preclude the presence or addition of one or more other features, integers, steps, operations, units, and/or components, and/or combinations thereof.

A person skilled in the art should realize that the boundary between the foregoing operations is merely illustrative. A plurality of operations may be combined into a single operation, and the single operation may be distributed among additional operations, and the operations may be performed at least partially overlap in time. In addition, alternative embodiments may include a plurality of instances of a particular operation, and the operation order may be changed in other various embodiments. However, other modifications, changes, and replacements are also possible. Therefore, the description and accompanying drawings are to be regarded as illustrative rather than limited.

Although some specific embodiments of the present disclosure have been described in detail through examples, a person skilled in the art may understand that the foregoing example are merely for description, but not for limiting the scope of the present disclosure. Embodiments disclosed herein may be randomly combined without departing from the spirit and scope of the present disclosure. It should also be understood by a person skilled in the art that various modifications may be made to the embodiments without departing from the scope and spirit of the present disclosure. The scope of the present disclosure is limited by the appended claims.

The invention claimed is:

1. A memory management method for a device, wherein the device comprises a plurality of hardware units, the memory management method comprises:
determining a plurality of application scenarios of the device;
determining a system memory block allocated to a corresponding hardware unit according to a number of physical memory blocks required by each hardware unit in each application scenario and according to an established mapping relationship between system memory blocks in a system memory and physical memory blocks in a physical memory, the system memory comprising the physical memory and an extended memory corresponding to physical memory blocks;
wherein various system memory blocks allocated to all hardware units operating in a same application scenario are mapped to different physical memory blocks respectively; or
among various system memory blocks allocated to at least two hardware units operating in different application scenarios respectively, a system memory block of at least one application scenario and a system memory block of another application scenario in the different application scenarios are mapped to a same physical memory block;
wherein the plurality of hardware units comprise a first hardware unit and a second hardware unit, the first hardware unit and the second hardware unit operate in different application scenarios respectively, the system memory comprises a first system memory block group allocated to the first hardware unit and a second system memory block group allocated to the second hardware unit, and at least part of the first system memory blocks in the first system memory block group and at least part of the second system memory blocks in the second system memory block group are mapped to a same physical memory block in the physical memory; or the plurality of hardware units comprise the first hardware unit and a sixth hardware unit, the first hardware unit and the sixth hardware unit both operate in at least one of the plurality of application scenarios, the system memory comprises a first system memory block group allocated to the first hardware unit and a sixth system memory block group allocated to the sixth hardware unit, and the first system memory block group and the sixth system memory block group are mapped to different physical memory blocks in the physical memory respectively.

2. The memory management method according to claim 1, wherein determining the system memory block allocated to the corresponding hardware unit comprises:
the system memory block is allocated such that all system memory blocks allocated to at least one hardware unit of the plurality of hardware units are mapped to successively distributed physical memory blocks in the physical memory.

3. The memory management method according to claim 2, wherein the system memory is allocated such that the at least one hardware unit corresponding to the successively distributed physical memory blocks in the physical memory is a hardware unit that requires a largest number of system memory blocks.

4. The memory management method according to claim 2, wherein the system memory is allocated such that a number of the hardware units corresponding to the successively distributed physical memory blocks in the physical memory is most among the plurality of hardware units.

5. The memory management method according to claim 1, wherein a size of the physical memory is greater than or equal to a size of the system memory required by an application scenario of the plurality of application scenarios that requires a most number of system memory blocks.

6. The memory management method according to claim 1, wherein an $(i+n*Np)^{th}$ extended memory block in the system memory blocks is mapped to an $i^{th}$ physical memory block in the physical memory respectively, wherein i is an integer greater than zero, n is an integer greater than or equal to zero, and Np is a total number of physical memory blocks in the physical memory.

7. The memory management method according to claim 1, wherein a size of the system memory is a multiple of that of the physical memory, and the multiple is a number greater than 1.

8. The memory management method according to claim 7, wherein the multiple of the size of the system memory to the size of the physical memory is determined according to a number of scenarios of the plurality of application scenarios.

9. A memory management device, comprising a storage, a processor, and instructions stored on the storage, wherein the instructions, when executed by the processor, implement steps of the memory management method according to claim 1.

10. A computing system, comprising
a computing device, the computing device comprising the memory management device according to claim 9.

11. The computing system according to claim 10, wherein determining the system memory block allocated to the corresponding hardware unit comprises:
the system memory block is allocated such that all system memory blocks allocated to at least one hardware unit of the plurality of hardware units are mapped to successively distributed physical memory blocks in the physical memory.

12. The computing system according to claim 10, wherein the computing device comprises an artificial intelligence Internet of Things device; and/or
the computing device is comprised in a system on chip.

13. The memory management device according to claim 9, wherein determining the system memory block allocated to the corresponding hardware unit comprises:
the system memory block is allocated such that all system memory blocks allocated to at least one hardware unit of the plurality of hardware units are mapped to successively distributed physical memory blocks in the physical memory.

14. The memory management device according to claim 13, wherein the system memory is allocated such that the at least one hardware unit corresponding to the successively distributed physical memory blocks in the physical memory is a hardware unit that requires a largest number of system memory blocks.

15. The memory management device according to claim 13, wherein the system memory is allocated such that a number of the hardware units corresponding to the successively distributed physical memory blocks in the physical memory is most among the plurality of hardware units.

16. The memory management device according to claim 9, wherein a size of the physical memory is greater than or equal to a size of the system memory required by an application scenario of the plurality of application scenarios that requires a most number of system memory blocks.

17. The memory management device according to claim 9, wherein an $(i+n*Np)^{th}$ extended memory block in the system memory blocks is mapped to an $i^{th}$ physical memory block in the physical memory respectively, wherein i is an integer greater than zero, n is an integer greater than or equal to zero, and Np is a total number of physical memory blocks in the physical memory.

18. The memory management device according to claim 9, wherein a size of the system memory is a multiple of that of the physical memory, and the multiple is a number greater than 1.

19. The memory management device according to claim 18, wherein the multiple of the size of the system memory to the size of the physical memory is determined according to a number of scenarios of the plurality of application scenarios.

20. A non-transitory computer-readable storage medium, on which instructions are stored, wherein the instructions, when executed by a processor, implement steps of the memory management method according to claim 1.

* * * * *